(12) United States Patent
Kunzel

(10) Patent No.: US 7,318,191 B2
(45) Date of Patent: Jan. 8, 2008

(54) AUTOMATED SYSTEM AND METHOD FOR DYNAMICALLY GENERATING CUSTOMIZED TYPESET QUESTION-BASED DOCUMENTS

(75) Inventor: Hartland E. Kunzel, New York, NY (US)

(73) Assignee: BHK Systems, L.P., New York, NY (US)

( * ) Notice: Subject to any disclaimer, the term of this patent is extended or adjusted under 35 U.S.C. 154(b) by 56 days.

(21) Appl. No.: 10/268,525

(22) Filed: Oct. 10, 2002

(65) Prior Publication Data

US 2004/0073866 A1 Apr. 15, 2004

(51) Int. Cl.
*G06N 3/00* (2006.01)
(52) U.S. Cl. ..................... 715/500; 715/513
(58) Field of Classification Search .................. 705/37; 715/513, 523, 517, 530, 500; 345/569, 173; 348/586; 706/45; 707/10; 434/353; 709/224
See application file for complete search history.

(56) References Cited

U.S. PATENT DOCUMENTS

| | | | | |
|---|---|---|---|---|
| 4,131,883 | A * | 12/1978 | Lundstrom | 345/469 |
| 5,666,139 | A * | 9/1997 | Thielens et al. | 345/173 |
| 5,696,918 | A * | 12/1997 | Barker et al. | 715/517 |
| 5,987,135 | A * | 11/1999 | Johnson et al. | 709/224 |
| 5,987,302 | A * | 11/1999 | Driscoll et al. | 434/353 |
| 6,014,643 | A * | 1/2000 | Minton | 705/37 |
| 6,055,518 | A * | 4/2000 | Franklin et al. | 705/37 |
| 6,067,553 | A * | 5/2000 | Downs et al. | 715/523 |
| 6,285,989 | B1 * | 9/2001 | Shoham | 705/37 |
| 6,288,753 | B1 * | 9/2001 | DeNicola et al. | 348/586 |
| 6,529,889 | B1 * | 3/2003 | Bromberg et al. | 706/45 |
| 6,631,377 | B2 * | 10/2003 | Kuzumaki | 707/10 |
| 6,638,315 | B2 * | 10/2003 | Uppiano et al. | 715/513 |

OTHER PUBLICATIONS

"Question Mark Perception- Authoring Manual," Version 1, Jun. 1998, <http://www.questionmark.com/us/perception/manuals/authoring_manual/>.*
Houser, Jeffry, ColdFusion 5: A Beginner's Guide, McGraw-Hill 2002, Book Cover, pp. v-xi, ISBN 0-07-219109-0.
Forta, Ben, Advanced Macromedia ColdFusion 5 Application Development, Que Publishing 2002, Book Cover, pp. iii-xii, ISBN 0-7897-2585-1.

(Continued)

*Primary Examiner*—Stephen Hong
*Assistant Examiner*—Kyle R Stork
(74) *Attorney, Agent, or Firm*—Amster, Rothstein & Ebenstein LLP

(57) ABSTRACT

The present invention generally relates to a system and method for dynamically generating customized, typeset publication quality question-based documents, such as examinations, answers and/or worked out solutions in a portable document format. More particularly, the system and method of the present invention enable users to select questions from a catalog of questions previously encrypted, loaded, and stored on a server. Additionally, the user is able to specify the sequence of the selected questions and insert heading and preamble information. Software components process this information to generate an examination document in a typeset portable document format, wherein the examination document includes the selected questions in the specified sequenced and heading and preamble information. The software concomitantly generates answer and worked-out solutions documents corresponding to the questions in the examination document. All generated documents are encrypted and stored on the system and are available for downloading.

20 Claims, 17 Drawing Sheets

OTHER PUBLICATIONS

Sharma, Rajesh, et. al. Cisco Security Bible, Hungry Minds 2002, Book Cover, pp. xvii-xxviii, ISBN 0-7645-4878-6.
Hewitt, Eben, Core ColdFusion, Prentice Hall 2002, Book Cover, pp. vii-xiv, ISBN 0-13-066061-2.
Flanagan, David, Javascript The Definitive Guide, Fourth Edition O'Reilly & Associates 2002, Book Cover, pp. vii-xii, ISBN 0-596-00048-0.
Wyke, Allen, et al., Pure Javascript, Second Edition, Sams Publishing 2002, Book Cover, p. iii, ISBN 0-672-32141-6.
Schmidt, Kevin, Macromedia ColdFusion 5 Training From the Source, Macromedia Press 2002, Book Cover, pp. vi-viii, ISBN 0-201-75847-4.
Meyer, Greg, et al., Hack Proofing ColdFusion, Syngress Publishing 2002, Book Cover, pp. xi-xxii, ISBN 1-928994-77-6.
Brown, Micah, et al. Essential ColdFusion 4.5 for Web Professionals, Prentice Hall 2001, Book Cover, pp. v-x, ISBN 0-13-040646-5.
Forta, Ben, et al., Certified ColdFusion 5 Developer Study Guide, Que Publishing 2001, Book Cover, pp. v-xvii, ISBN 0-7897-2696-3.
Cortes, Chris,Optimizing ColdFusion 5, McGraw-Hill 2001, Book Cover, pp. v-xii, ISBN 0-07-219304-2.
Kauffman, John, et al., Beginning SQL Programming, Wrox Press 2001, Book Cover, pp. i-xiv, ISBN 1-861001-80-0.
Houser, Jeffry, Instant ColdFusion 5, McGraw-Hill 2001, Book Cover, pp. ix-xv, ISBN 0-07-213238-8.
O'Keefe, Ryan, et al., Professional ColdFusion 5, Wrox Press 2001, Book Cover, pp. i-xxvii, ISBN 1861004540.
Shapiro, Jeffrey, SQL Server 2000: The Complete Reference, McGraw-Hill 2001, Book Cover, pp. v-xxii, ISBN 0-07-212588-8.
Riordan, Rebecca, Microsoft SQL Server 2000 Programming Step by Step, Microsoft Press 2001, Book Cover, pp. xvii-xxv, ISBN 0-7356-1142-4.
Adobe Staff, Adobe Acrobat 5.0 Classroom in a Book, Adobe Systems, Inc. 2001, Book Cover, pp. iii-vii, ISBN—Not Listed In Book.
Shadovitz, Deborah, Adobe GoLive 5 Bible, IDG Books Worldwide 2001, Book Cover, pp. xxiii-xlii, ISBN 0-7645-3347-9.
Sunderic, Dejan, SQL Server 2000 Stored Procedure Programming, McGraw-Hill 2001, Book Cover, pp. ix-xvi, ISBN 0-07-212566-7.
Microsoft Staff, Microsoft SQL Server 2000 Resource Kit, Microsoft Press 2001, Book Cover, pp. v-xxxvi, ISBN 0-7356-1266-8.
Adobe Systems, Inc., Forms Data Format Toolkit Overview, Adobe Systems, Inc. 2001, Document Cover Sheet, pp. iii-v.
Adobe Systems, Inc., Forms Data Format Toolkit Reference, Adobe Systems, Inc. 2001, Document Cover Sheet pp. iii-vi.
Brooks-Bilson, Rob, Programming ColdFusion, O'Reilly 2001, Book Cover, pp. v-ix, ISBN 1-56592-698-6.
Davidson, Louis, Professional SQL Server 2000 Database Design, Wrox Press 2001, Book Cover, pp. i-xii, ISBN 1-861004-7-61.
Delaney, Kalen, Inside Microsoft SQL Server 2000, Microsoft Press 2001, Book Cover, pp. v-xx, ISBN 0-7356-0998-5.
Forta, Ben, et al., The Macromedia ColdFusion 5 Web Application Construction Kit, 4th Edition, Que 2001, Book Cover, pp. iii-xvi, ISBN 0-7897-2584-3.
Mason, Andrew G., Cisco Secure Internet Security Solutions, Cisco Press 2001, Book Cover, pp. viii-vxii, ISBN 1-58705-016-1.
Padova, Ted, Adobe Acrobat 5 PDF Bible, Hungry Minds 2001, Book Cover, pp. xvii-xxvi, ISBN 0-7645-3577-3.
Carlson, Jeff, et al., Real World Adobe GoLive 5, Peachpit Press 2001, Book Cover, pp. xxiv-xl, ISBN 0-0201-70406-4.
Nelson, Steve, et al., Fusebox: Methodology and Techniques, JM Publishers 2000, Book Cover, pp. iii-x, ISBN 0-9673447-4-3.
Adobe Staff, Adobe Illustrator 9.0 Classroom in a Book, Adobe Systems Inc. 2000, Book Cover, pp. iii-viii, ISBN 0-201-71015-3.
Gruber, Martin, Mastering SQL, Sybex Inc. 2000, Book Cover, pp. ix-xxii, ISGN 0-7821-2538-7.
Velte, Toby, et al., Cisco Internetworking with Windows NT & 2000, McGraw Hill 2000, Book Cover, pp. v-xvii, ISBN 0-07-212083-5.
Petkovic, Dusan, SQL Server 2000: A Beginner's Guide, McGraw-Hill 2000, Book Cover, pp. iii-xiv, ISBN 0-07-212-587-X.
Pearrow, Mark, Web Site Usability Handbook, Charles River Media, Inc. 2000, Book Cover, pp. vii-xi, ISBN 1-58450-026-3.
Krug, Steve, Don'Make Me Think, Que Publishing 2000, Book Cover, pp. vi-vii, ISBN 0-7897-2310-7.
Bradley, T.C. III, ColdFusion, Prima Publishing 2000, Book Cover, pp. x-xviii, ISBN 0-7615-3016-9.
Wagner, Richard, et al., Javascript Unleashed, Third Edition, Sams Publishing 2000, Book Cover, pp. v-xviii, ISBN 0-672-31763-X.
Holzschlag, Holly, Special Edition, Using HTML 4, Sixth Edition, Que Publishing 2000, Book Cover, pp. iv-xvi, ISBN 0-7897-2267-4.
Brenton, Chris, Mastering Cisco Routers, Sybex, Inc. 2000, Book Cover, pp. ix-xvi, ISBN 0-7821-2643-X.
Hallberg, Bruce, Networking: A Beginner's Guide, McGraw-Hill 2000, Book Cover, pp. v-xii, ISBN 0-07-212226-9.
Wilton, Paul, Beginning Javascript, Wrox Press 2000, Book Cover, pp. i-x, ISBN 1-861004-06-0.
Adobe Staff, Adobe GoLive 5 Classroom in a Book, Adobe Systems, Inc. 2000, Book Cover, pp. iii-viii, ISBN 0-201-71017-X.
Mohnike, Charles, Teach Yourself Allaire ColdFusion in 21 Days, Sams Publishing 2000, Book Cover, pp. v-xiv, ISBN 0-672-31796-6.
Danesh, Arman, et al., Mastering ColdFusion 4.5, Sybex, Inc. 2000, Book Cover, pp. xii-xxviii, ISBN 0-7821-2773-8.
Adobe Systems, Inc., PDF Reference, 2nd Edition, Addison-Wesley, 1985-2000, Book Cover, pp. iii-v, ISBN 0-201-61588-6.
Nielsen, Jakob, Designing Web Usability: The Practice of Simplicity, New Riders Publishing 2000, Book Cover, pp. iv-ix, ISBN 1-56205-810-X.
Pfaffenberger, Bryan, et al., HTML 4 Bible, 2nd Edition, IDG Books Worldwide 2000, Book Cover, pp. xvii-xxxv, ISBN 0-7645-3473-4.
Vieira, Robert, Professional SQL Server 2000 Programming, Wrox Press 2000, Book Cover, pp. i-xxiii, ISBN 1-861004-48-6.
Paquet, Catherine, Building Cisco Remote Access Networks, Cisco Press 1999, Book Cover, pp. ix-xxv, ISBN 1-57870-091-4.
Jaworski, James, Mastering Javascript and Jscript, Sybex, Inc. 1999, Book Cover, pp. ix-xxii, ISBN 0-7821-2492-5.
Gilorien, DHTML & Javascript, Prentice Hall 1999, Book Cover, pp. iii-xv, ISBN 0-13-086334-3.
Goossens, Michael, et al., The LaTex Web Companion, Addison-Wesley 1999, Book Cover, pp. v-x, 25-81, ISBN 0-201-43311-7.
Gregg, Kenneth, et al., Microsoft Windows NT Server Administrator's Bible 1999, Book Cover, pp. xxi-xxxvii, ISBN 0-7645-3213-8.
Kopka, Helmut, et al., A Guide to LaTex, Addison-Wesley 1999, Book Cover, pp. xi-xii, ISBN 0-201-39825-7.
Ray, John, Special Edition Using TCP/IP, Que Corporation 1999, Book Cover, pp. vii-xii, ISBN 0-7897-1897-9.
Adobe Systems, Inc., Forms System Implementation Notes, Adobe Systems, Inc. 1999, pp. 1-6.
Adobe Systems, Inc., FDF Toolkit Overview, Technical Note #5194, Adobe Systems, Inc. 1999, Document Cover Sheet, pp. iv-vi.
Adobe Systems, Inc., FDF Toolkit Reference, Technical Note #5193, Adobe Systems, Inc. 1999, Document Cover Sheet, pp. iv-ix.
Adobe Staff, Adobe Illustrator 8.0 Classroom in a Book, Adobe Systems, Inc. 1998, Book Cover, pp. iii-ix, ISBN 1-56830-470-6.
Adobe Staff, Adobe Photoshop 5.0 Classroom in a Book, Adobe Systems, Inc. 1998, Book Cover, pp. iii-ix, ISBN—Not Listed in Book.
Straznitskas, Matt, Mastering Photoshop 5 for the Web, Sybex, Inc. 1998, Book Cover, pp. xiv-xxiv, ISBN 0-7821-2230-2.
Goodman, Danny, Javascript Bible, 3rd Edition, IDG Books Worldwide 1998, Book Cover, pp. xix-xxxv, ISBN 0-7645-3188-3.
Guthrie, Malcolm, Forms Interactivity for the World Wide Web, Adobe Systems Incorporated 1998, Book Cover, pp. 10-11, ISBN 1-56830-455-2.
Merz, Thomas, Web Publishing with Acrobat/PDF, Springer-Verlag 1998, Book Cover, pp. v-vii, ISBN 3-540-63762-1.
Hockett, Shirley, et al., How to Prepare For The AP Calculus Advanced Placement Examination, 6th Ed., Barron's Educational Series, Inc. 1998, Book Cover, p. iii, ISBN 0-7641-0186-2.

Zakour, John, et al., HTML 4 How-To, Waite Group Press 1997, Book Cover, pp. vii-xv, ISBN 1-57169-125-1.
Ray, Deborah, et al., Mastering HTML 4.0, Sybex, Inc. 1997, Book Cover, pp. xii-xix, ISBN 0-7821-2102-0.
Brown, Dave, et al., Web Design & Publishing Unleashed, Sams.net Publishing 1997, Book Cover, pp. v-xxv, ISBN 1-57521-252-8.
Howell, Nelson, et al., Using Internet Information Server 4, Special Edition, Que 1997, Book Cover, pp. vii-xxvi, ISBN 0-7897-1263-6.
Weiss, Aaron, et al., Web Authoring Desk Reference, Hayden Books 1997, Book Cover, pp. vi-vii, ISBN 1-56830-352-1.
Hahn, Jane, Latex For Everyone, Personal Tex, Inc. 1991, Book Cover, pp. i-vii, ISBN—Not Listed In Book.
Lamport, Leslie, LaTex: A Document Preparation System, Addison-Welsey 1986, Book Cover, pp. iii-viii, ISBN 0-201-15790-X.
Knuth, Donald E., The TeXBook, Addison-Wesley 1984, Book Cover, pp. viii-ix, ISBN 0-201-13448-9.
www.CyberStudy101.com, 3 Website samples pages, Jun. 28, 2002.
www.MathXL.com, 5 Website sample pages, Jun. 28, 2002.
www.ExamBank.com, 3 Website sample pages, Jun. 28, 2002.
www.barronregents.com, 4 Website sample pages, Oct. 9, 2002.
www.questionmark.com, 11 Website Sample Pages, Oct. 9, 2002.
Moret, Bernard M.E., Bridging the Gap Between Theory and Practice, The Journal of Electronic Publishing, Univ. of Michigan Press, Sep. 1997, 3:1 (downloaded from http://www.press.umich.edu/jep/03-01/JEA.html).

* cited by examiner

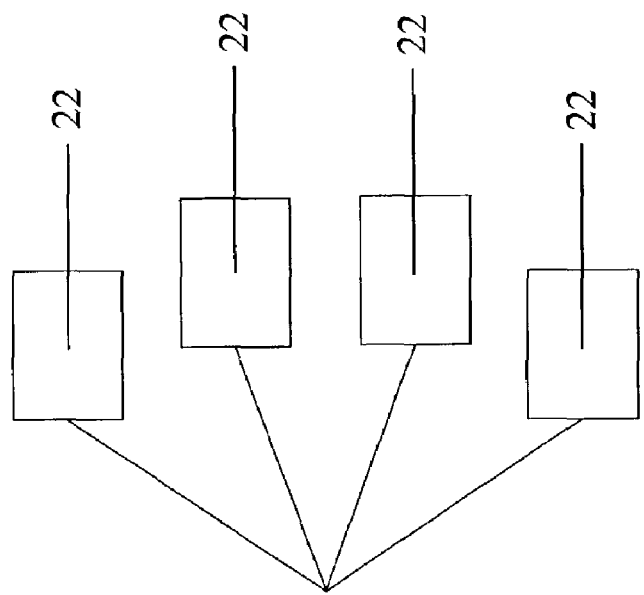
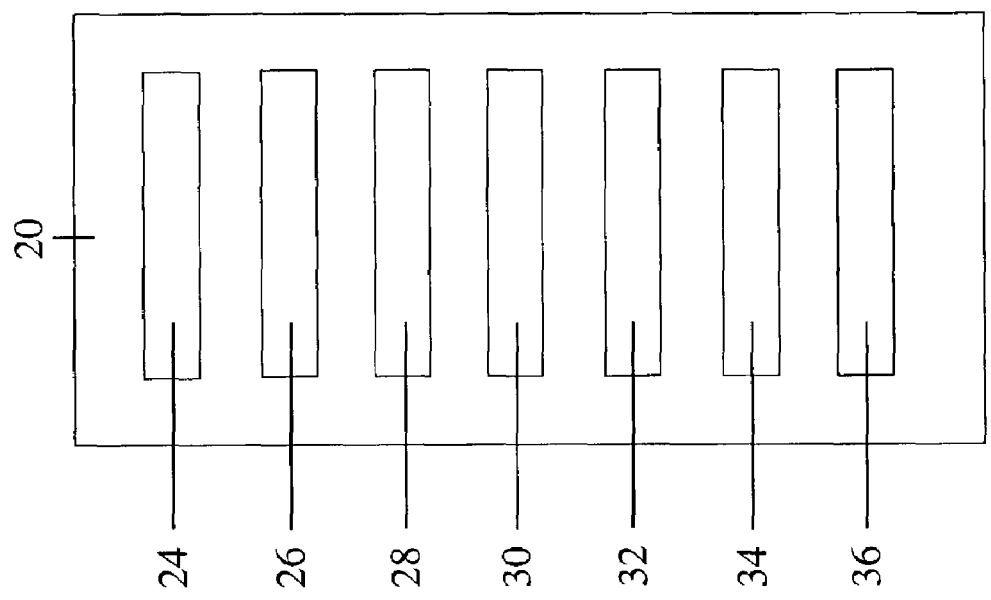
FIG. 1

| Home | Login | Subjects | Exams | My Account | Help |

Display Alphabetically  Display Chronologically                                Cancel Other Exams for Current Subject / Creation Date    Headings  Preamble  Questions  Entire Fall 2001 Quiz 01
09/10/2001 09:05:00

Fall 2001 Midterm
10/15/2001 11:05:00

Click one of the buttons
for an exam to transfer
the specified data to the
current exam.

Click Cancel to return to
the questions page.

Current Subject:  Calculus 101
Current Exam:    Fall 2001 Final

AUTOMATED SYSTEM AND METHOD FOR DYNAMICALLY GENERATING CUSTOMIZED TYPESET QUESTION-BASED DOCUMENTS

FIELD OF THE INVENTION

The present invention generally relates to a system and method for automatically generating customized typeset publication quality question-based documents, such as examinations, answers, and worked out solutions, in a portable document format. More particularly, the system and method of the present invention enables users to: select questions from a catalog of questions previously loaded and stored on a server; specify the sequence of the selected questions; and insert headings, preambles, instructions and the like corresponding to such questions. The system and method of the present invention processes this information and dynamically generates question-based documents in a typeset publication quality, portable document format. These documents include the selected questions in the specified sequence, as well as the preambles and headings specified by the user.

BACKGROUND OF THE INVENTION

Educators and others involved in measuring the skill, knowledge, intelligence, capacities and/or aptitudes of students and other individuals have long relied on typeset publication quality question-based documents as teaching aids. Such question-based documents are more commonly referred to as study guides. Study guides typically include questions, answers and worked out solutions and are usually typeset publication quality documents, as is the case with most educational textbooks. A variety of publishers, such as Barron's Educational Series, Inc. and Arco Publishing, Inc., typeset, print and distribute study guides throughout the world. This process is typically time consuming and costly to publishers.

Typesetting has become the standard for the publishing industry for a variety of reasons. For example, typesetting ensures that a line with large word spaces (due to justification) does not fall next to a line with small word spaces. Additionally, typesetting ensures that a page of text does not have too many hyphenated words. Likewise, typesetting kerns combinations of characters, such as "A" and "V", so as to bring them closer together, thereby making them easier to read. Further, the typeset format replaces combinations of characters such as "fi" and "ff" with ligatures. Additionally, typesetting formats a page such that a heading, for example, will not commence near the bottom of a page. Similarly, typesetting permits a publisher to insert a standard amount of vertical space around headings, lists, etc. As a result, typeset documents appear more polished, professional and legible than non-typeset documents.

Teachers often rely on study guides for a variety of purposes. For example, a high school class may consist of thirty students who are required to take a standardized examination (e.g., the Advanced Placement Calculus Examination) at the end of the school year. To assist her students in their preparation for such examinations, the teacher provides her class with copies of a published study guide, which may include a questions manual and a solutions manual. In this example, the study guide includes 240 questions and an index which lists all of the questions organized by topic. The solutions manual includes an answer key and step-by-step worked out solutions for each of the questions.

During the course of the school year, the teacher may wish to assign homework questions from the study guide that relate to a particular topic. Thus, the teacher typically reviews the index in the study guide and assigns a set of homework questions to her students which relate to the particular topic. Accordingly, the students consult their copy of the study guide and complete the assigned questions.

In addition to assigning questions from the study guide as homework, the teacher may wish to make up a quiz which comprises questions from the study guide. In such cases, the teacher typically photocopies the questions from the study guide or retypes them. Additionally, the teacher may take similar steps in distributing answers and/or worked out solutions to the quiz. Disadvantageously, the teacher expends a great deal of time cutting and pasting (or retyping questions, answers and/or worked out solutions), thereby occupying time which could have otherwise been more productively spent (e.g., grading exams, preparing lesson plans, etc.)

To compound these problems, it is quite possible that the study guide contains errors. A teacher who discovers these errors may communicate them to the publisher of the study guide. The publisher, in turn, notes these errors and prints errata sheets, which are sent to the owners of the study guide. Additionally, the publisher may incorporate the corrections into the next version of the study guide. Thus, the process of correcting errors in a study guide is typically cumbersome, time consuming and costly to publishers.

In 1997, the applicant developed a process, known as Examinations Express, for producing tests which is not the subject of this application. This prior process connected a Disk Operating System (DOS) client to a DOS bulletin board system (BBS) server through the plain old telephone system (POTS). Although useful at the time, this process did not incorporate features of the system and method of the present invention as generally described supra in the "Field Of The Invention", and did not dynamically generate typeset publication quality question-based documents in a portable document format pursuant to user specifications created by a user.

Additionally, others have implemented Internet-based "test-making" sites such as www.barronsregents.com. Although useful for certain purposes, these other web sites do not dynamically generate typeset publication quality question-based documents in a portable document format pursuant to specifications created by a user. Thus, these other web sites are not useful to those who wish to generate typeset publication quality question-based documents in a portable document format.

In this regard, these other Internet-based "test-making" web sites typically generate question-based documents which are in the Hypertext Markup Language (HTML), a known markup language for creating documents that will be displayed in web browsers. This markup language is significantly limited as compared with page description languages, e.g., PostScript®, which are utilized in professional typesetting systems. One commentator explained the shortcomings of the use of HTML for publication purposes as follows: "[f] or some applications, the methods employed to disseminate information across the World Wide Web are unacceptable. This is because they leave the rendering of the 'page' to the reader's software, not to the author's software. Even if pure HTML and Cascading Style Sheets are used, the author does not know where line breaks will occur, and, of course there is no concept of 'page breaks.' Graphics are often presented as low-resolution bitmaps with unreliable colors; table layout may be radically different. The author cannot even be sure which font will be seen by the reader, or whether some unsuitable symbols may be used in mathematics, for example. Finally, and perhaps most important, the current generation of Web browsers is not very sophisticated at typesetting and page makeup; the result of hitting the Print icon from a browser does not produce a high-quality result." Michael Gossens, et. al., The Latex Web Companion, p.25 (1999).

Additionally, currently available encryption techniques for HTML files provide relatively low levels of security for a publisher's copyrights for catalogs of questions or dynamically generated question-based documents downloaded in this format.

While the prior art is of interest, the known methods and apparatus of the prior art present several limitations which the present invention seeks to overcome.

In particular, it is an object of the present invention to provide a system and method for dynamically generating typeset publication quality question-based documents in a portable document format pursuant to specifications created by a user.

It is another object of the present invention to provide a system and method which enables a user to selectively copy questions, heading information, and/or entire contents of previously generated typeset question-based documents.

It is a further object of the present invention to provide a system and method which includes encryption techniques for portable document format files. Currently available encryption techniques for portable document format files provide relatively high levels of security for a publisher's copyrights for catalogs of questions or dynamically generated question-based documents downloaded in this format.

It is another object of the present invention to solve shortcomings of the prior art.

Further objects and advantages will become apparent from a consideration of the ensuing description and drawings.

SUMMARY OF THE INVENTION

It has now been found that the above and related objects of the present invention are obtained in the form of a system and method which enables users to dynamically generate customized typeset publication quality question-based documents by offering: online typeset catalogs for user selection of questions; online forms for user entry of heading and preamble information; the ability to direct the typesetting of questions, answers and/or worked out solutions documents in a portable document format; and a mechanism to download these documents for viewing and printing at their site.

More particularly, the system and method of the present invention provides a framework for the installation of a typeset publication quality catalog of questions on a networked system (open or closed) such that the catalog can be communicated between a publisher and an educator. The catalog of questions contains an electronic table of contents and sections of questions grouped by topic, wherein the groups of questions include check boxes and numeric identifiers next to each question. To create a homework assignment or quiz, the teacher simply selects the check box next to each desired question. The software of the system processes the selections made by the teacher and outputs a list of all of the selected questions, including an alphanumeric identifier for each question. The sequence in which the selected questions will appear in the typeset document may be modified by entering numbers in text fields corresponding to the alphanumeric identifier for each question. The list can be further modified by selecting or de-selecting a check box for other questions.

The teacher is also provided with the ability to further customize question-based documents by specifying other information to be incorporated therein. In this regard, the user is provided with online forms for the entry of: heading and preamble information to appear at the top of the first sheet and/or other sheets of a questions document, answer document and/or worked out solutions document.

Once entered by the user, the system saves all these user specifications including the selected questions in the specified sequence, the headings and the preambles. The user is also provided with the ability to copy questions, heading information, preamble information and/or the entire contents from one exam to another. Additionally, the system incorporates software which enables an educator to generate a draft of the examination prior to directing the final typesetting of all related documents. If desired, the educator can further edit the examination document by modifying the specifications using the steps described above.

The system incorporates software which generates a final examination document in typeset publication quality, portable document format based upon the user specifications. The portable document format retains the fidelity of the publication quality document which was typeset with the PostScript®. The portable document format also allows for interoperability amongst different computer platforms. The system also incorporates software which generates typeset publication quality answers and/or worked out solutions documents in a portable document format concomitantly with the generation of the final examination. All typeset documents are stored on the system for subsequent downloading and printing by the teacher. These documents can also be displayed on large screens in lecture halls by projectors attached to laptop computers.

BRIEF DESCRIPTION OF THE DRAWINGS

The above and related objects, features and advantages of the present invention will be more fully understood with reference to the following detailed description of the preferred, albeit illustrative, embodiment(s) of the present invention when considered in conjunction with the accompanying figures, wherein;

FIG. 1 shows a schematic of a plurality of users connected to a server with several software components implemented in one embodiment of the system and method of the present invention;

FIG. 4 shows the Registration Page of the web site implemented in one embodiment of the system and method of the present invention;

FIG. 5 shows the Login Page of the web site implemented in one embodiment of the system and method of the present invention;

FIG. 8C shows the Questions Page of FIGS. 8A-8B displaying a group of questions with check boxes and alphanumeric identifiers next to each question;

FIG. 8D shows the Questions Page of FIGS. 8A-8C displaying a list of selected questions with check boxes and alphanumeric identifiers next to each question, as well as a draft of an examination;

FIG. 9 shows the Headings Page of the web site implemented in one embodiment of the system and method of the present invention;

FIG. 10 shows the Preamble Page of the web site implemented in one embodiment of the system and method of the present invention;

FIG. 11 shows the Copy Exam Page of the web site implemented in one embodiment of the system and method of the present invention;

FIG. 13B shows the Download Page of FIG. 13A displaying a final typeset question document.

DETAILED DESCRIPTION OF THE PREFERRED EMBODIMENT(S)

Figure 2:
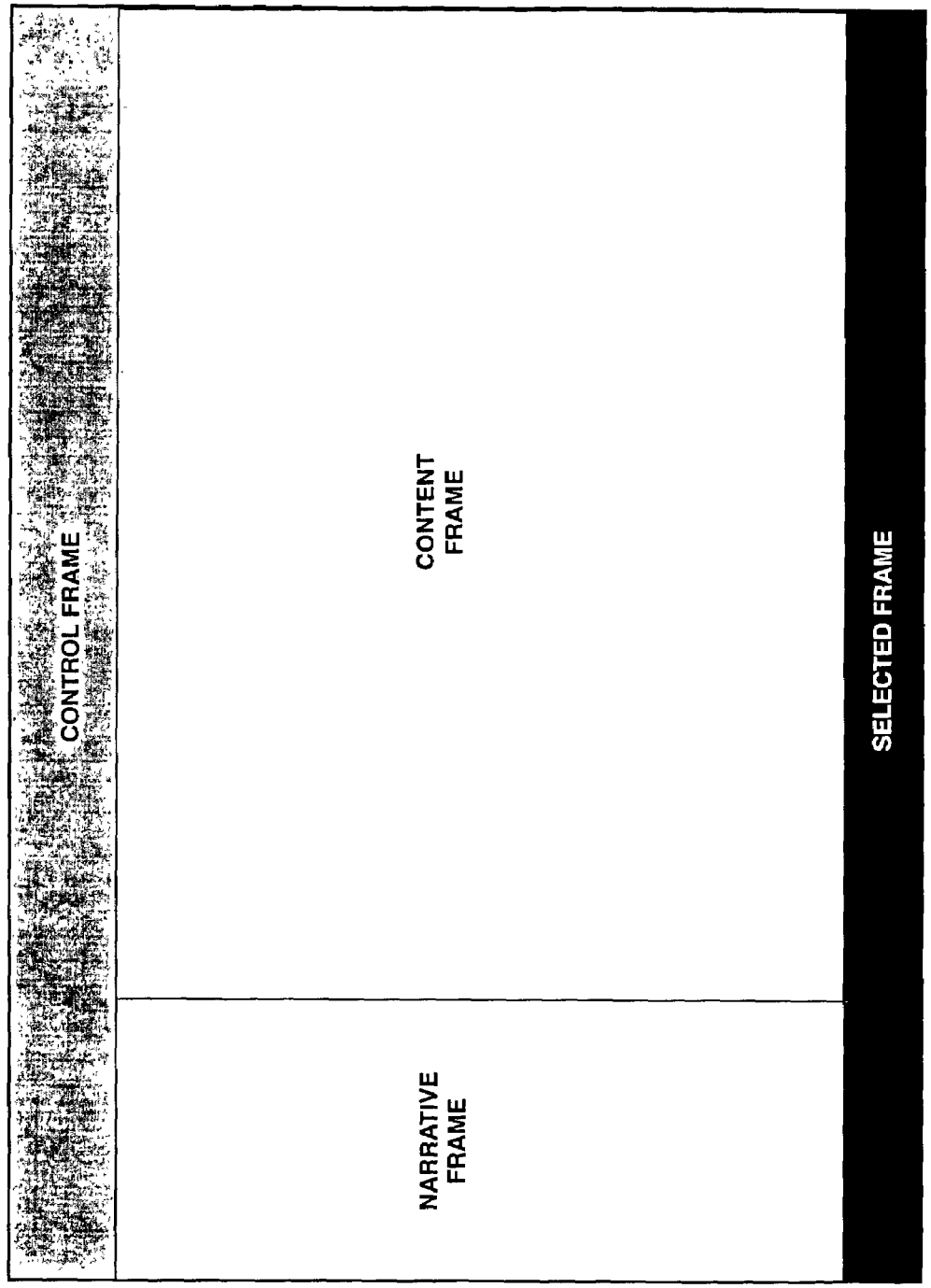
FIG. 2 shows the frameset for the pages of the web site implemented in one embodiment of the system and method of the present invention.

The present invention generally relates to a system and method for dynamically generating customized typeset publication quality question-based documents in a portable document format. More particularly, typeset catalogs of questions, as well as databases containing typesetting details for all available questions and associated answers and worked-out solutions, are stored on the system in a manner which permits a user to: select specific questions to be incorporated into question-based documents; customize the question-based documents by specifying the sequence of the selected questions and/or by entering heading and preamble information to be incorporated therein; typeset the question-based documents; store such typeset documents in an encrypted portable document format; and download these documents for viewing and printing. In the preferred embodiment, these different functions are carried out by various software applications which interact with each other. Thus, before describing the operation of the system and method of the present invention in detail, the preferable configuration of the present invention as well as these various software applications and the manner in which relevant data and information is stored on the system is first described.

The present invention is preferably configured as a client-server networked system, as shown in FIG. 1. In the preferred embodiment, the server 20 operates an Internet web-site running various software applications for the generation of typeset publication quality question-based documents in portable document format. In this embodiment, the client 22 is a user's (e.g., an educator, student or any other user of the system) computer having a web browser with a portable format document file reader plug-in for accessing, via the web-site, a typeset catalog of questions as well as other data and information stored on the server. It should be noted, however, that the system and method of the present invention can be deployed across a variety of different platforms, including for example, a closed network or a stand-alone system.

Before describing the various software applications maintained on the server, the manner in which pertinent data and information is stored on the server 20 is first described. More particularly, a catalog 24 of typeset questions is stored on a hard drive in the server 20 in a portable document format. By storing the catalog of questions in a portable document format, a publisher may encrypt the catalog file with a relatively high level of security to preclude users from accessing the file without authorization to do so. In this regard, the catalog of questions could be encrypted to require the payment of a license fee in order to gain access to such catalogs. In the preferred embodiment, these catalogs 24 are stored as specific sections of questions organized by topic. Additionally, a table of contents 26 is created and stored on the server 20. The table of contents 26 includes linking information which relates topics listed in the table of contents 26 with associated sections of questions. Furthermore, as described below, the user can create lists of selected questions, specify the sequence of the selected questions and insert headings and preambles (collectively referred to as "User Specifications") for any given examination. Accordingly, a relational database 28 is created and maintained on the server for storing all User Specifications. Additionally, a flat file database 30 is created and maintained on the server 20 for storing typesetting details for all questions, associated answers and/or worked out solutions available in the system.

The system implements various software components for establishing and maintaining a web-site as well as for entering, accessing and processing the User Specifications stored on the server. More particularly, in one embodiment, the server includes three software components, hereinafter referred to as "front end software" 32, "middleware software" 34 and "back end software" 36, which interact with each other to generate customized typeset publication quality question-based documents in portable document format. Each of these three software components is described below.

In the preferred, albeit illustrative, embodiment, the front end software 32 includes web server software, such as Microsoft Internet Information Server and application server software, e.g., ColdFusion® Server, for processing requests from the client's web browser. Additionally, the front end software includes relational database management software, such as Microsoft SQL Server, for managing the User Specifications stored in the relational database. It should be noted, however, that other types of web server software, relational database management software and databases maybe used in a similar manner.

In the preferred embodiment, the middleware software 34 includes program code modules which are parsed by the ColdFusion® Server. Preferably, these program code modules are written in the ColdFusion® Markup Language. Of course, other types of similar software may also be used. The middleware software provides: the user interface for all web pages; SQL statements for storing User Specifications in the relational database; and code for copying User Specifications from the relational database to a text file which is used as an input file for the back end software. This input file is sent to one of several Processing Directories after it is created by the middleware software 34.

In the preferred embodiment, the back end software 36 includes proprietary software, which continually scans the Processing Directories for the text files which contain User Specifications for an examination as prepared by the middleware software 34. After it finds a text file containing user specifications, the back end proprietary software 36 creates a second text file which is used as an input file for a typesetting program. In the preferred embodiment, this second text file includes three types of information. It should be noted, however, this second text file is not limited to these three types of information and could certainly be modified to include more (or less) information, depending upon the needs of a publisher and users. The first type of information is the heading and preamble details for each question-based document which is obtained from the first text file created by the middleware software. The second type of information is the typesetting details for each question and its associated answer and/or worked out solution. This second type of information is obtained from the flat file database. The third type of information provides coded commands for a typesetting program which defines: the margins, type style, numbering style for pages, chapters, equations, etc.; the paragraph indentation; and all other formatting information needed to typeset the desired documents. This third type of information is created by the proprietary software itself based on the name of the current subject. In the preferred embodiment, commercially available software, such as various versions of TEX/DVIPS or other suitable software now known or hereinafter developed, can be used to process the second text file into typeset publication quality question, answer and/or worked out solution documents in PostScript®. Likewise, commercially available software, such as various versions of PS/PDF or other suitable software now known or hereinafter developed, can be used to continually scan the processing directories for PostScript® files and process them into portable document format files. Further, commercially available software, such as various versions of PDF/Encrypt or other suitable software now known or hereinafter developed, can be used to encrypt these portable document format files with a relatively high level of security on the fly. It should be noted however, that the present invention may use any variation of different types of software, whether commercial or proprietary, which perform similar functions.

After they are dynamically generated, the question, answer and/or worked out solutions documents are stored on the server 20 (e.g., Internet web-site) by the middleware software 34 for subsequent downloading, viewing and printing by the user.

It should be noted that the software of the present invention is not limited to the configuration as described herein. In this regard, there is no requirement that the front end 32, middleware 34, and back end 36 software be maintained as three separate software components. Rather, it is only important that the software of the present invention perform the functions or equivalents thereto, of the front end 32, middleware 34 and back end 36 software. Accordingly, other similar software configurations would also be suitable for the purposes of the present invention.

Having described the underlying software and data stored on the server 20, the manner in which the web site of the preferred embodiment is organized is now described. More particularly, the web site should include various web pages for enabling a user to create an examination. In this regard, web pages should be provided to enable a user to: select specific questions; specify the sequence of the selected questions; insert headings and preambles; and create a typeset exam containing selected questions in the specified sequence, preambles and headings in a portable document format.

In one embodiment, the web site of the present invention includes a variety of pages through which a user can navigate to generate typeset publication quality question-based documents in a portable document format. More particularly and referring to FIG. 2, in this embodiment, each page includes a control frame which includes navigation tabs for guiding users through the web site, a narrative frame for displaying help messages, a content frame for displaying pertinent information stored on the web site and a selected frame for displaying the name of the subject and exam with which the user is currently working.

Figure 3:
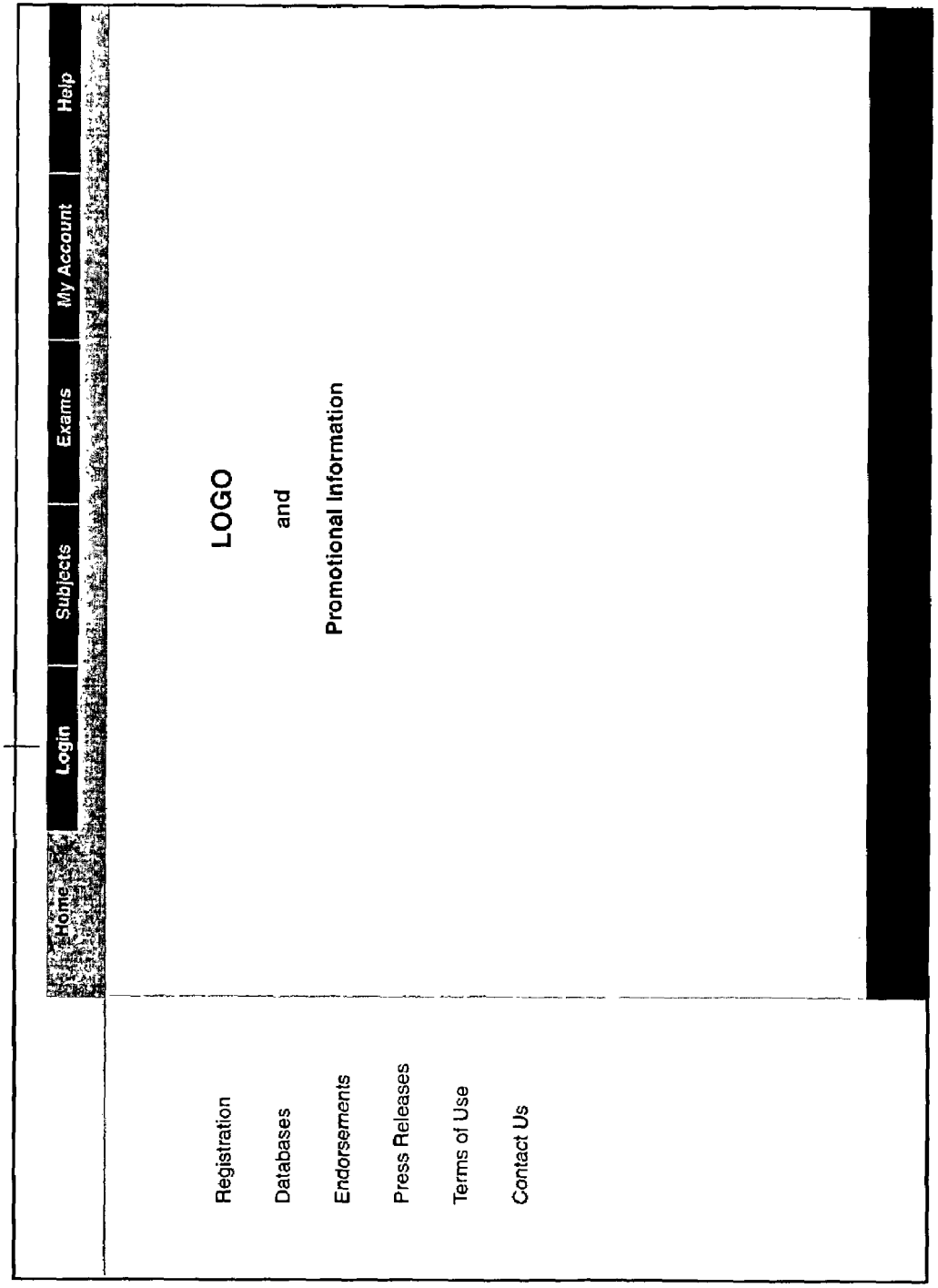
FIG. 3 shows the Home Page of the web site implemented in one embodiment of the system and method of the present invention.

Referring to FIG. 3, the website includes a home page which provides links to a registration page and a login page 38.

Figure 4:
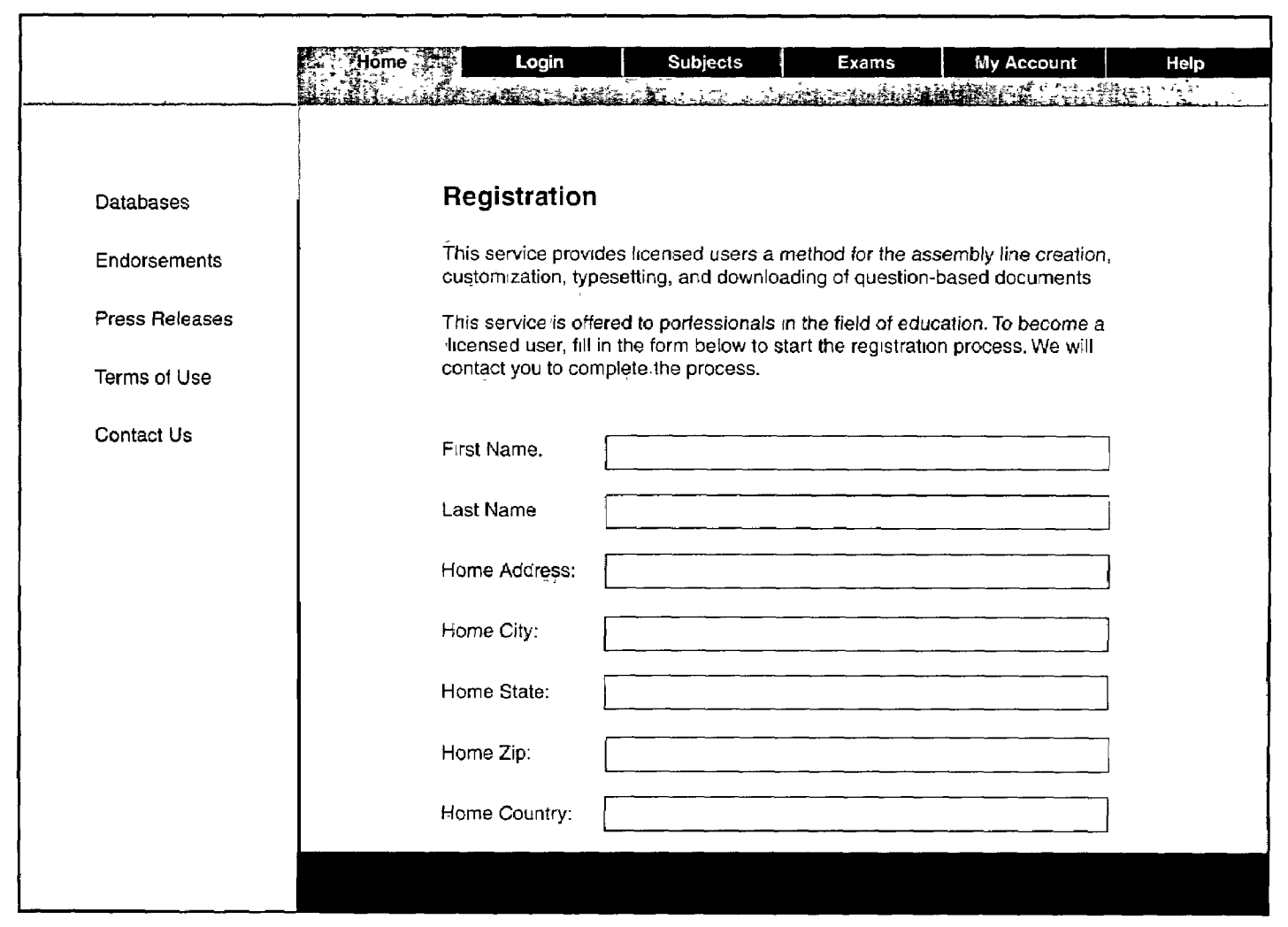
Figure 5:
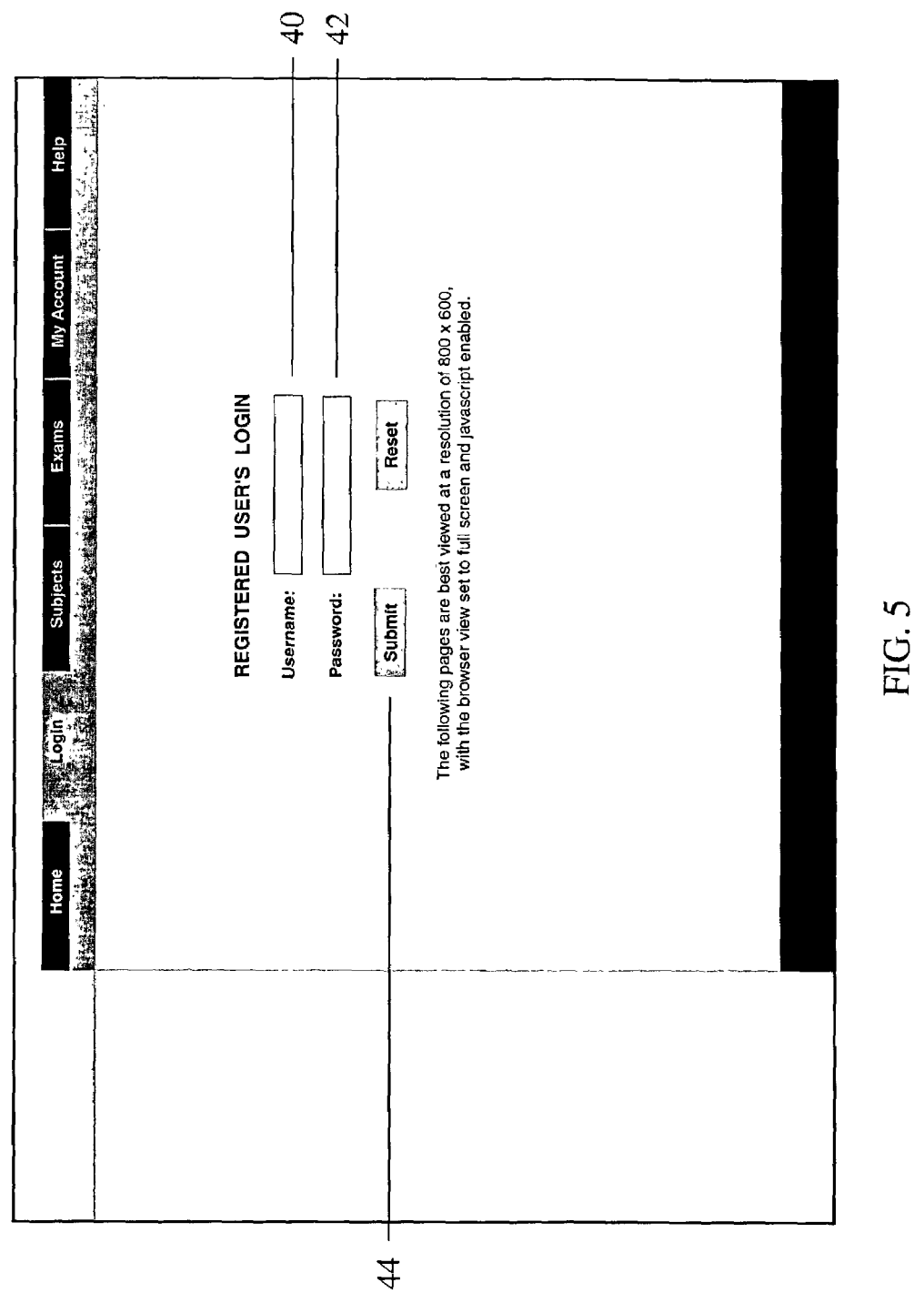

Referring to FIG. 4, the web site includes a Registration Page which requires the entry of personal information (i.e., name, address, etc.) by a prospective user. The Registration Page initiates a process for obtaining a license to use a catalog of questions stored on the site as well as for obtaining a username and password required for accessing the "processing" pages of the site. Other "advertisement" pages may be optionally provided for displaying other general information relating to the web site and the web site administrator (e.g., press releases, endorsements, contact information, etc.). Additionally, a Login Page is provided for allowing a registered user to access the web site by submitting 44 his or her user name 40 and password 42, as shown in FIG. 5.

Figure 6:
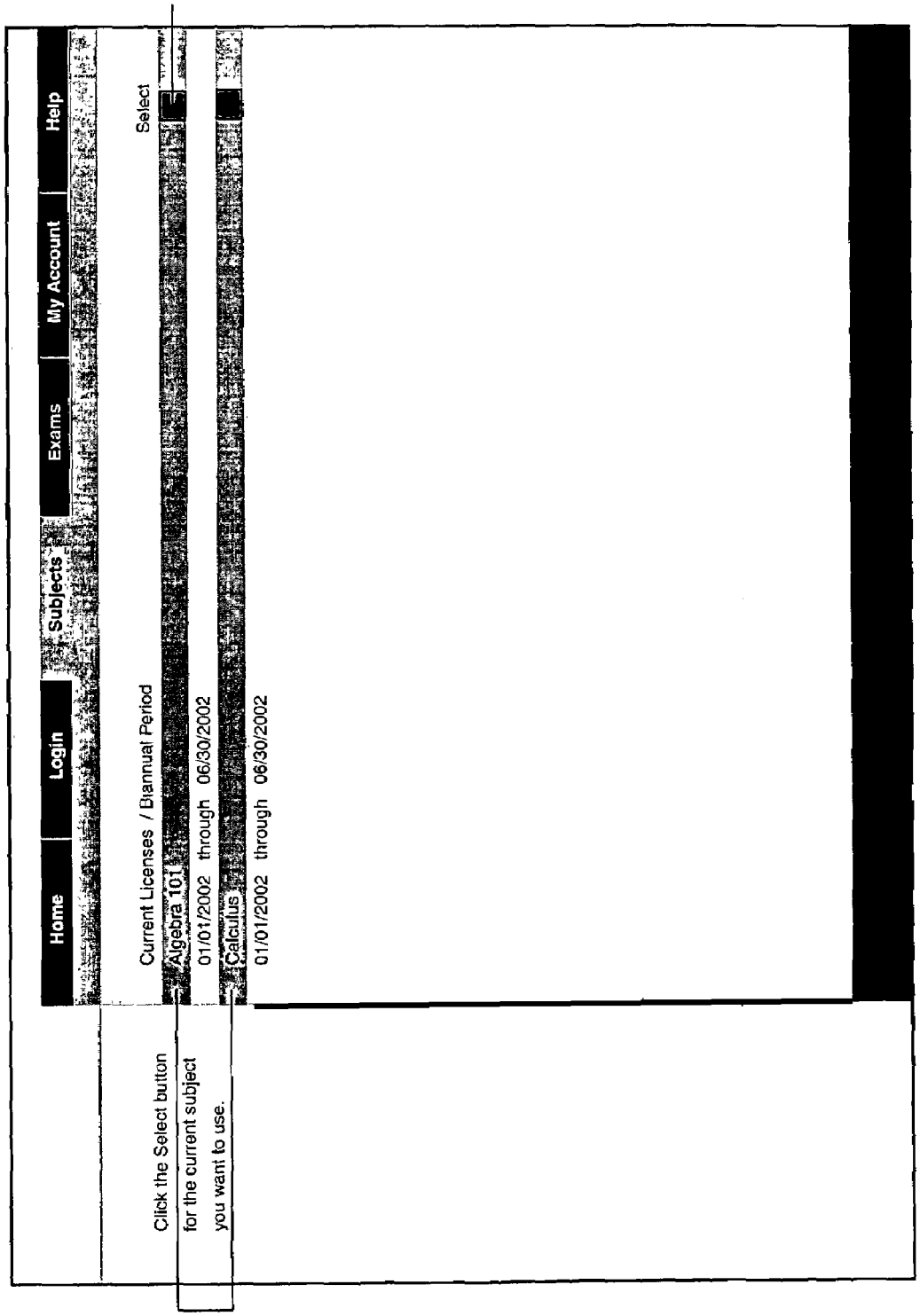
FIG. 6 shows the Subjects Page of the web site implemented in one embodiment of the system and method of the present invention.

Once the user has logged onto the web site, various pages are made available to the user for processing exams. For example, a Subjects Page (FIG. 6) displays a list 46 of the subjects which the user is licensed to use. This list is generated by SQL statements included in the middleware software. A button 48 is provided on the Subjects Page which enables a user to select a specific subject to work with.

Figure 7:
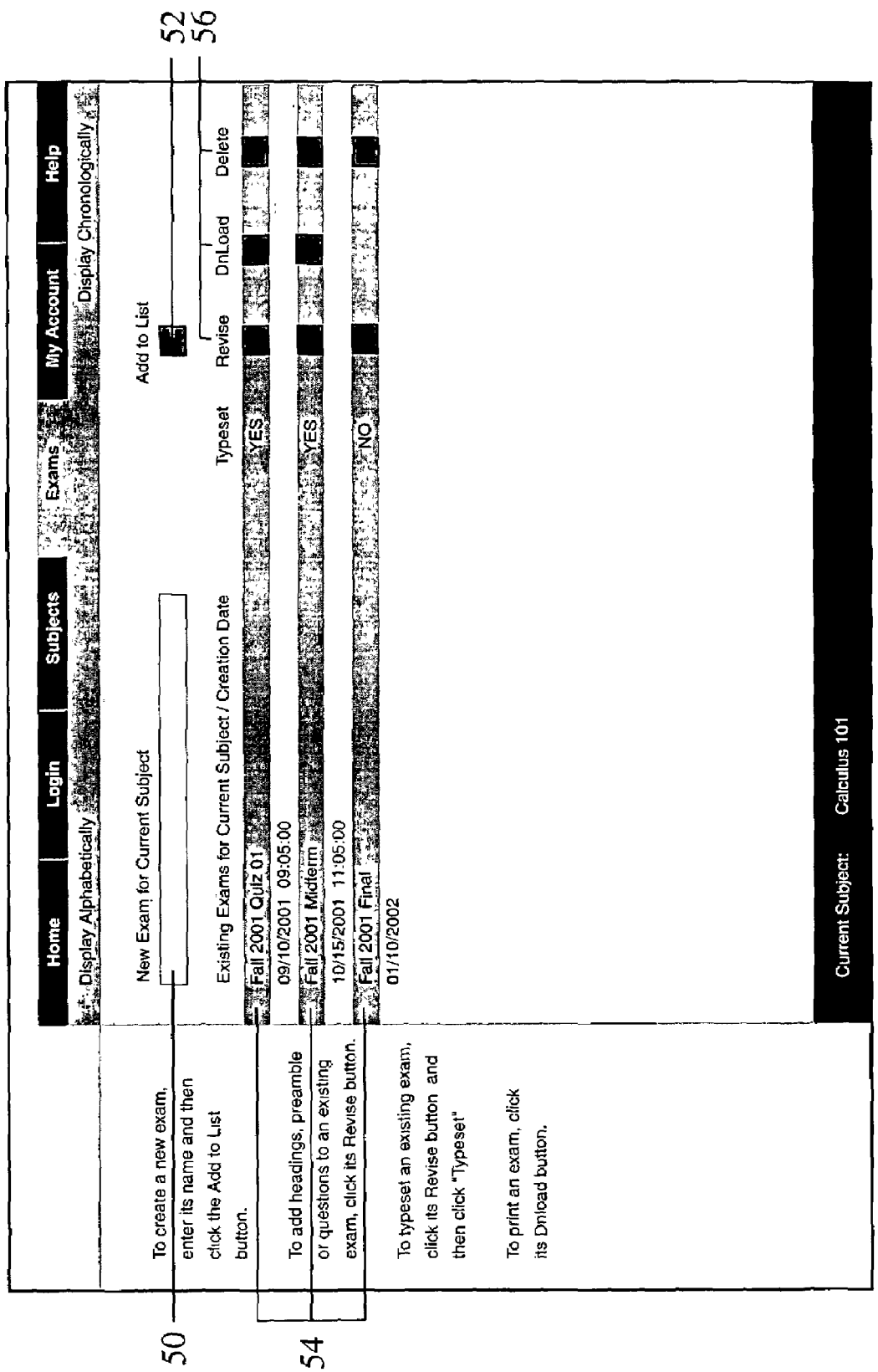
FIG. 7 shows the Exams Page of the web site implemented in one embodiment of the system and method of the present invention.

Additionally, an Exams Page (FIG. 7) is provided which enables a user to create a new exam for the selected subject or select an exam from a list 54 of already existing exams for further processing. Here again, the list 54 of already existing exams is generated by SQL statements included in the middleware software 34. The Exams Page may optionally display descriptive information relating to each listed exam, including, for example, the title of the exam, the date the exam was generated and whether the exam has been typeset. Additionally, the Exams Page includes buttons 56 for enabling the user to revise, download or delete an already existing exam. Additionally, the user may add other exams to the list by entering a new user name in a text field 50 and then clicking and add to list button 52.

Figure 8A:
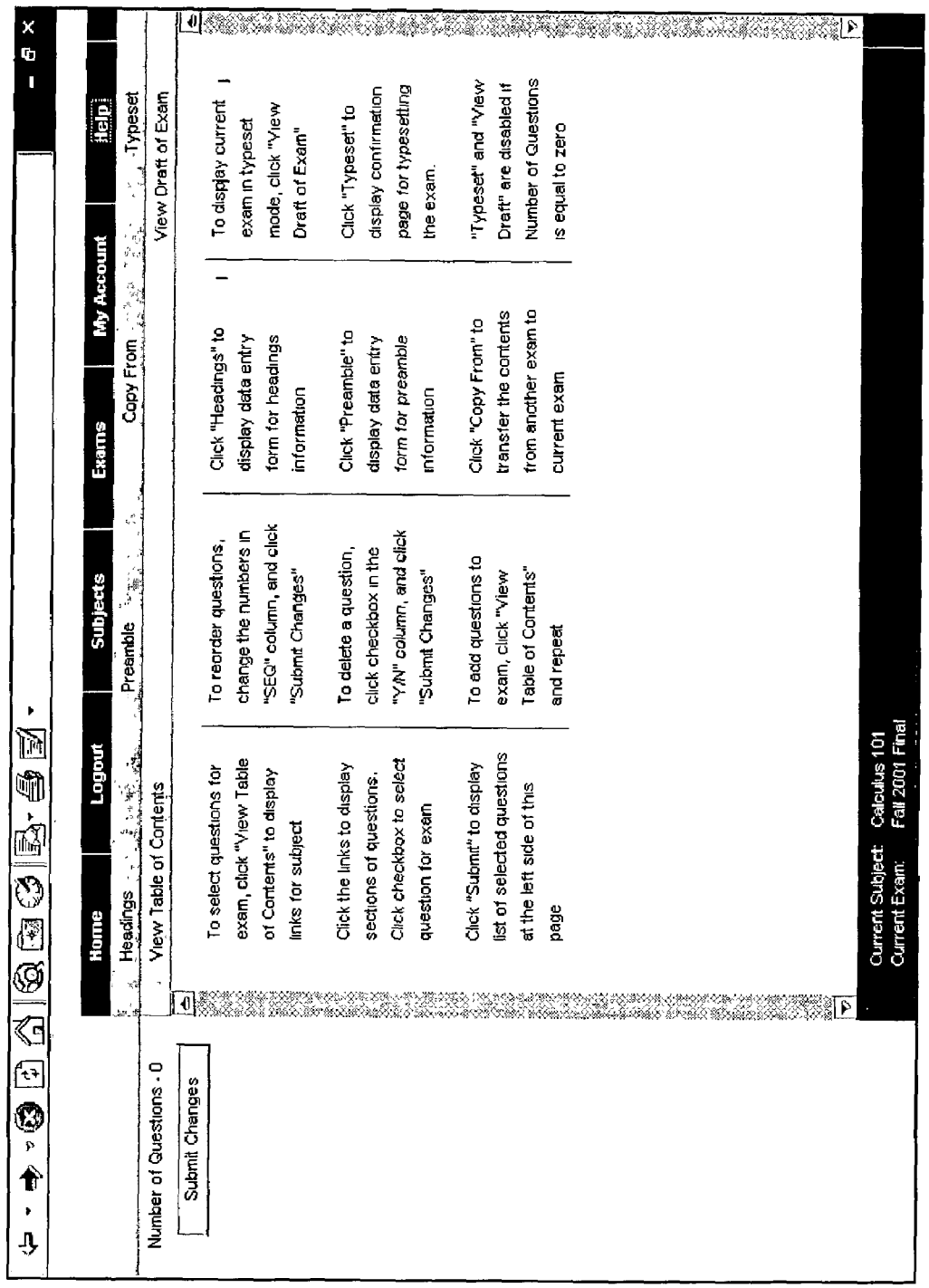
FIG. 8A shows the Questions Page of the web site implemented in one embodiment of the system and method of the present invention.
Figure 8B:
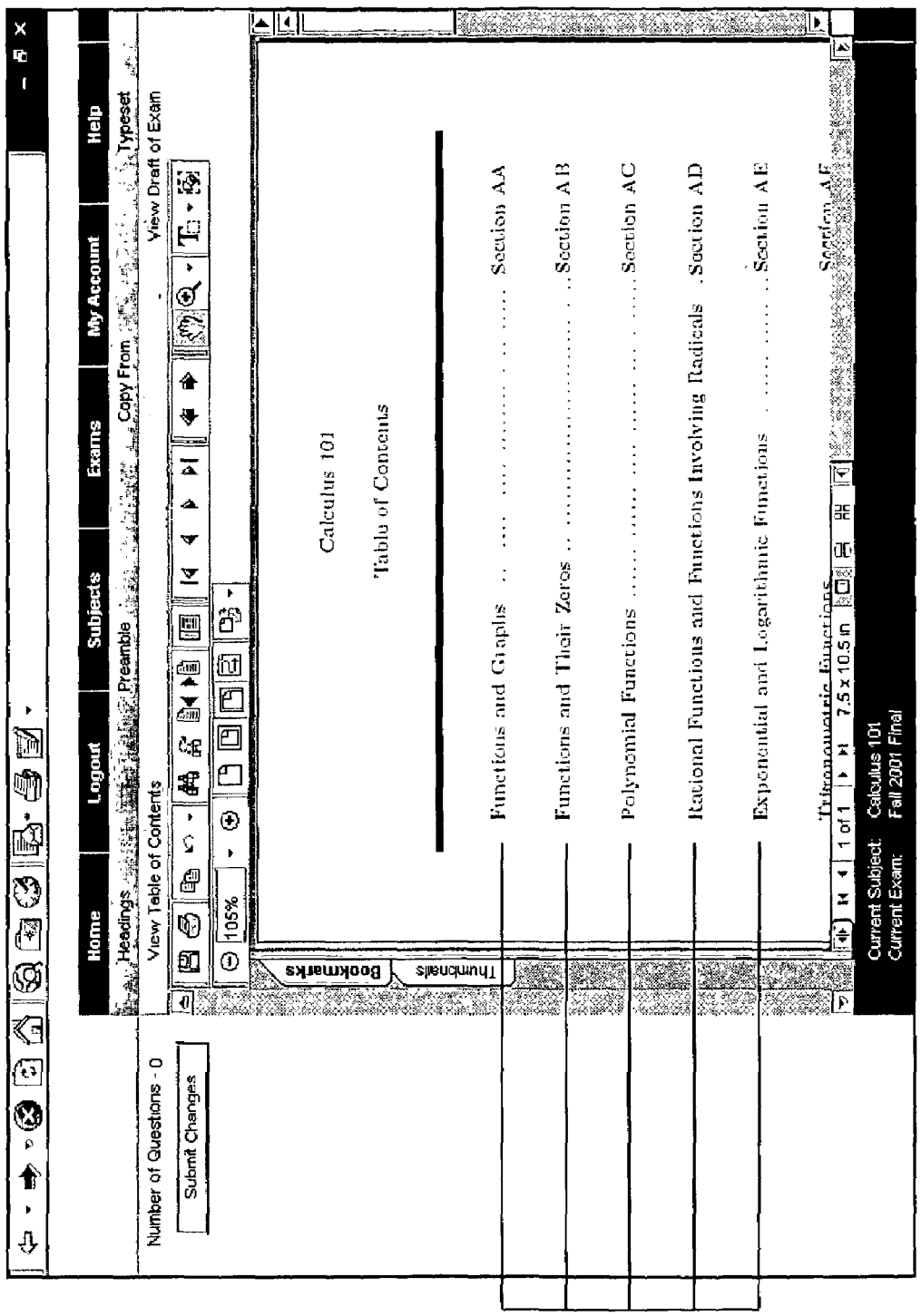
FIG. 8B shows the Questions Page of FIG. 8A displaying a table of contents listing question topics.
Figure 8C:
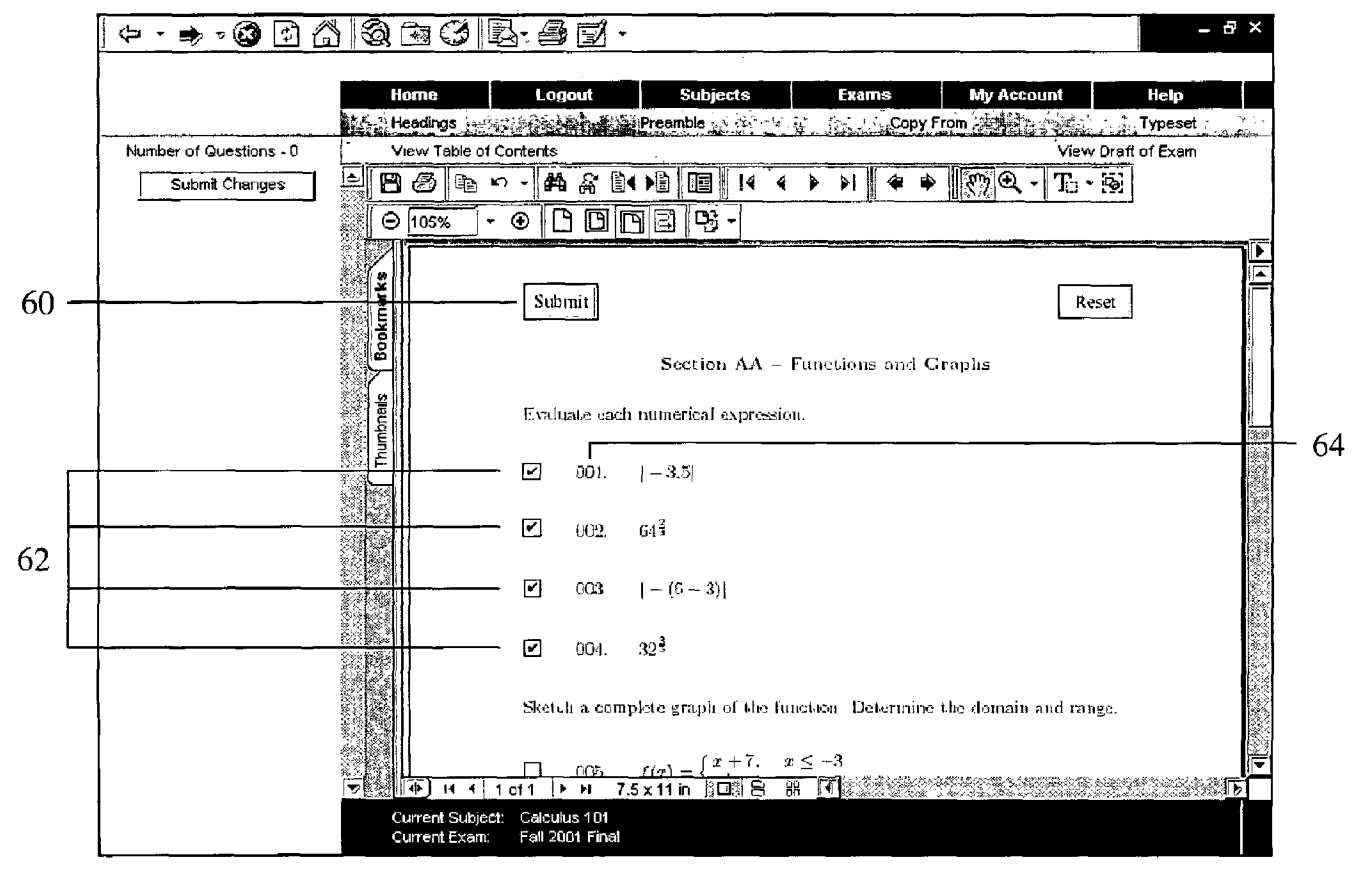
Figure 8D:
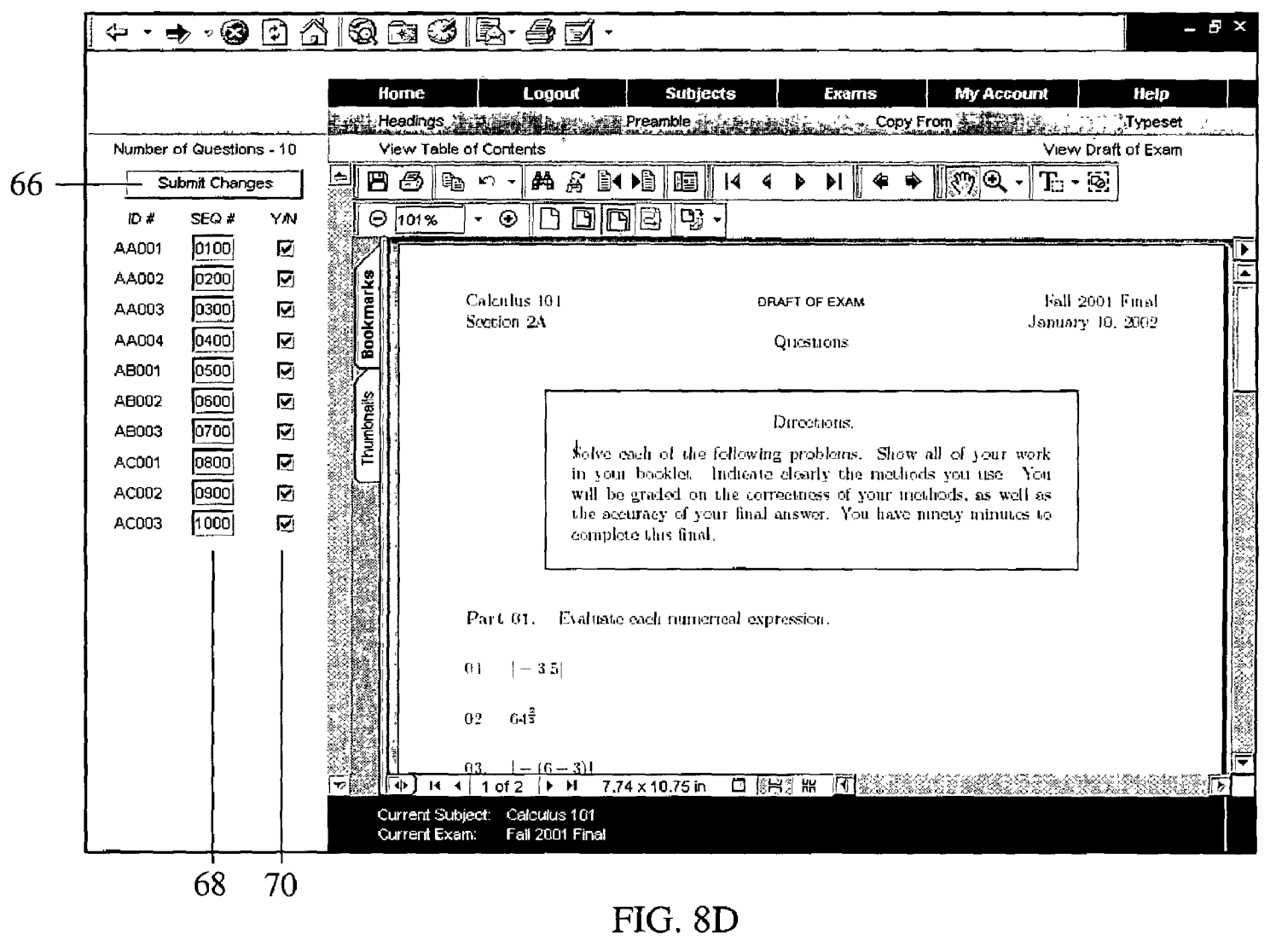

Additionally, a Questions Page is provided (FIGS. 8A-8D) which enables users to review, select and sequence questions for an exam. More specifically, the Questions Page can display a table of contents for the selected subject as shown in FIG. 8B. The table of contents includes links 58 to sections of questions grouped by topic which are stored on the server. Accordingly, if a user wishes to view these sections of questions, the user simply selects the appropriate link in the table of contents. Upon doing so, the selected section of questions is displayed, as shown in FIG. 8C. Each question is listed by an identification number 64 in the content frame as shown in FIG. 8C. A user selects questions by clicking check boxes 62 next to the identification number and then clicks the submit 60 button. The Questions Page is redisplayed and a list of the selected questions appears in the narrative frame as shown in FIG. 8D. The list of selected questions includes a text field 68 labeled "SEQ #." A user may revise the order that the selected questions are to appear in an exam by revising the number in the text field corresponding to each selected question. The list additionally includes a check box for each selected question which is initially checked for all selected questions. A user may delete a selected question from the exam by clicking the check box which clears the check. Clicking the Submit Changes button 66 will cause the Questions Page to be redisplayed with the list revised with the changes.

Additionally, a Headings Page (FIG. 9) is provided which enables a user to enter headings into text fields 72 for the question, answer and worked out solution documents for the currently selected subject/exam. Similarly, a Preamble Page (FIG. 10) is provided which enables a user to enter into text fields 76 preamble information which will appear under the heading for the first page of the questions document.

A Copy Exam Page (FIG. 10) is further provided which enables users to copy data from other exams into the current exam. Each stored exam for the current subject is included in a list 80. For each of the exams in list 80, the user can copy the headings, preamble, questions or entire contents by clicking one of the provided buttons 82. Thereafter, the selected components of the exam (i.e., headings, or preamble, questions) can be displayed for further editing. The user may simply edit the selected component in accordance with the methods described above.

Figure 12:
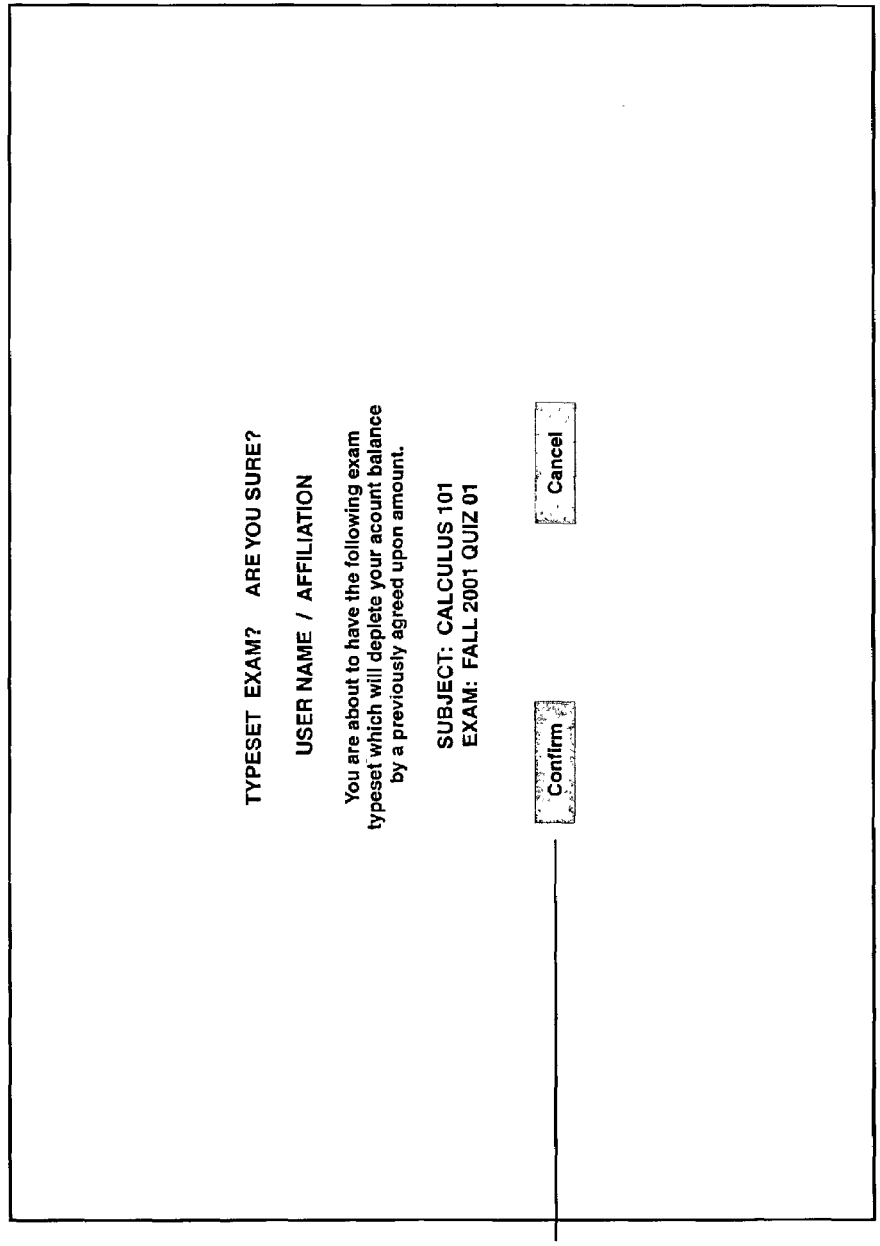
FIG. 12 shows the Confirm Typeset Page of the web site implemented in one embodiment of the system and method of the present invention.
Figure 13A:
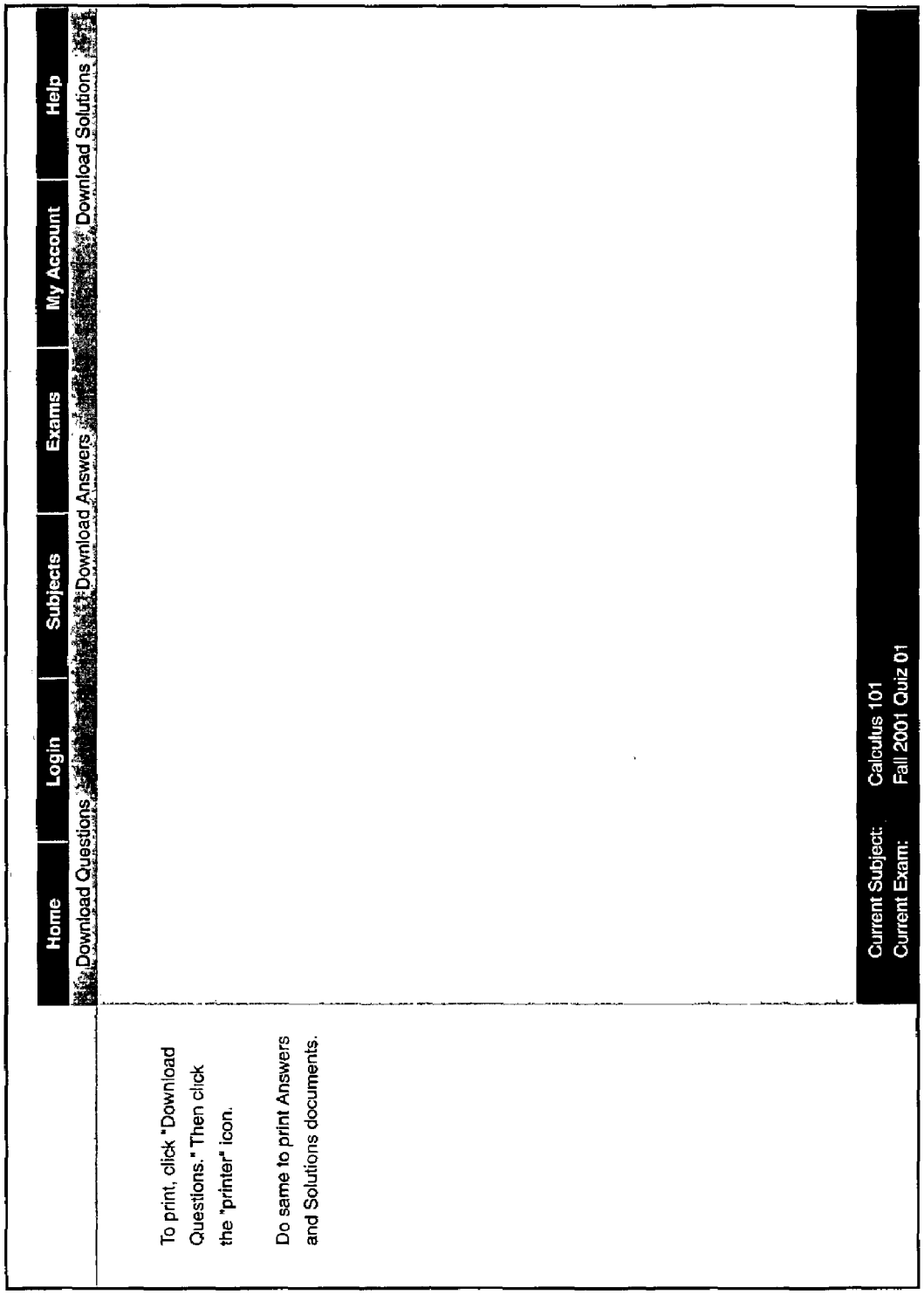
FIG. 13A shows the Download Page of the web site implemented in one embodiment of the system and method of the present invention.
Figure 13B:
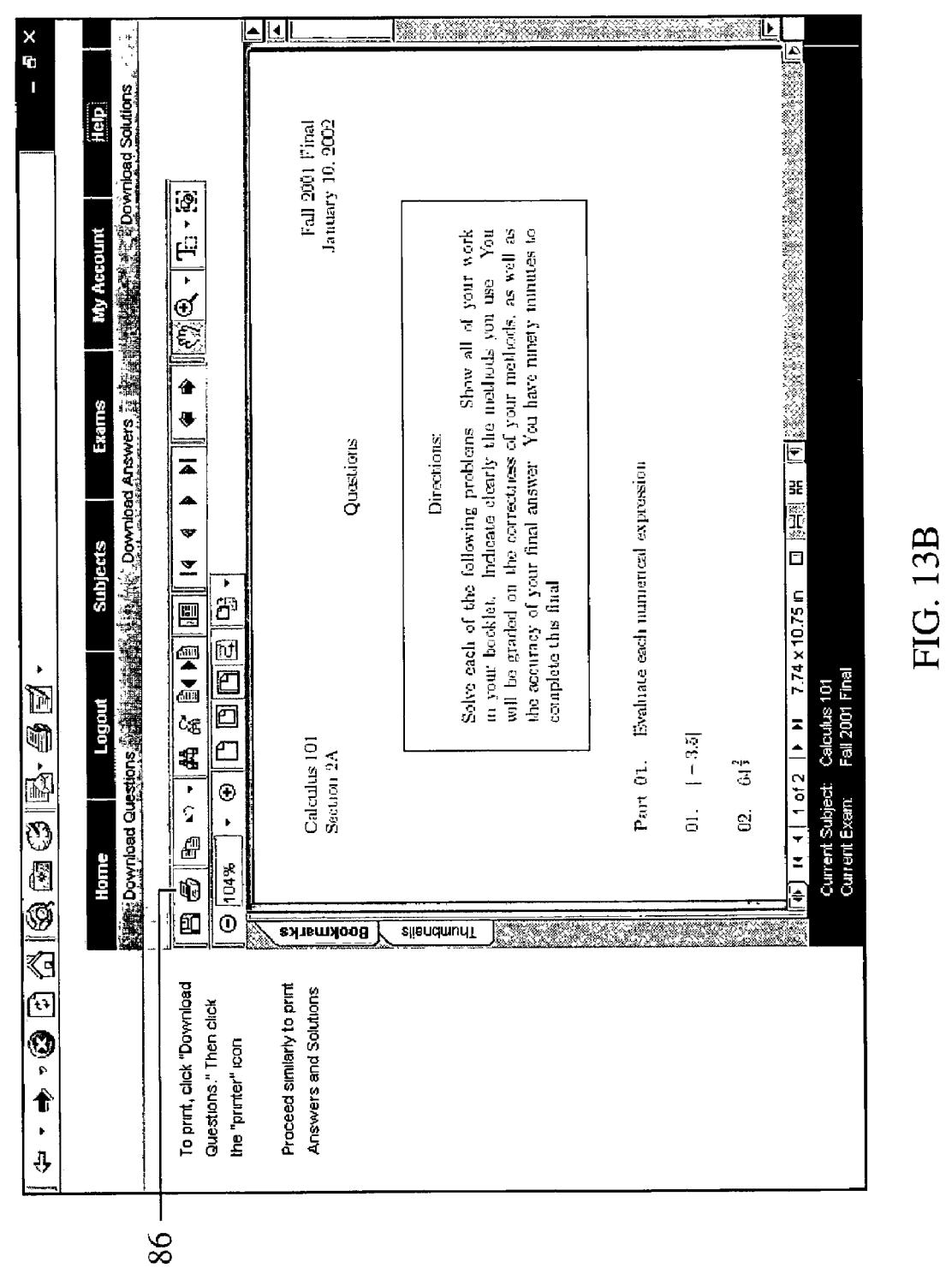

Additionally, a Confirm Typeset page is provided which enables the user to initiate the final typesetting of an exam, as shown in FIG. 12. Clicking the confirm button on the confirm typeset page causes the following actions to occur: the middleware software 34 creates the first text file for processing by the backend proprietary software 36; the backend proprietary software 36 creates the question-based documents in Postscript®; the PostScript® conversion software creates the question-based documents in portable document format; the encryption software incorporates the desired access permissions into the question-based documents in portable document format; the middleware software 34 copies the encrypted question-based documents from the processing directory to a permanent storage area on the server with a unique filename; the middleware software 34 enters this unique filename into the relational database in a manner which associates it with the name of the selected exam; and the exams page is displayed with the letter "Y" in the typeset status column for the selected exam. Once the question-based documents are created and stored in typeset portable document format, additional pages are provided which enable a user to download them to a client (FIGS. 13A-B).

Other web pages may be provided for displaying and managing a user's account. Likewise, pages may be provided to enable the web site's administrator to access the web site and modify its content.

The method of creating a typeset customized examination is now described. An Internet client directs an Internet browser with a portable document file reader plug-in to the URL of the Internet server computer system and a Home Page is displayed (FIG. 3). A user clicks a "Login" link 38, and a Login page is displayed. (FIG. 5).

A user enters a username and secure password pair into text fields 40 and 42 respectively and then clicks the submit button 44. After validation of the username and secure password by the server system, the Subjects Page is displayed (FIG. 6) which lists the subjects 46 that the user is licensed to use.

The user clicks the select button 48 for one of the listed subjects and the name of the selected subject is uploaded to the server for storage. The Exams Page (FIG. 7) is displayed which includes the name of selected subject as the Current Subject. The user enters the name of a new exam in a text field 50 and clicks the Add to List button 52. The Exams Page is redisplayed with the name of the new exam included in the list of already existing exams. The user clicks its Revise button 56 and the Questions Page (FIG. 8A) is displayed.

The Questions Page includes the name of the new exam as the Current Exam as well as the following links: View Table of Contents, Headings, Preamble, View Draft of Exam, Typeset, and Copy From.

The user clicks the View Table of Contents link and the Questions Page is redisplayed (FIG. 8B) with a table of contents for the catalog of questions for the current subject. The items listed are links 58 to sections of questions grouped by topic.

Next, the user may click one of the links 58 and the Questions Page is redisplayed (FIG. 8C) with: the section of questions for the selected topic; a Submit button 60; check boxes 62; and numeric identifier 64 for each question. An alpha identifier for the section of questions (e.g., AA) is combined with these numeric identifiers 64 to provide a unique alphanumeric identifier for each and every question contained in the catalog of questions for the current subject. The user may next click check boxes 62 to select questions. Next, the user selects the submit button 60. The check box 62 information is uploaded to the server for storage and the Questions Page is redisplayed (FIG. 8D)

The redisplayed Questions Page includes a Submit Changes button 66 and a list of the selected questions at the left side of the page. This list includes the unique alphanumeric identifiers for each question, text fields 68 for sequence numbers and Yes/No ("Y/N") check boxes 70 which are initially checked.

To re-sequence the list of questions, the user revises the numbers in the text fields 68. To delete a question, the user clicks it's (Yes/No) check box to clear the check mark. Thereafter, the user clicks the submit changes button 66. Next, the Questions Page is redisplayed with the list of selected questions at the left side of the page revised to reflect the Submitted Changes.

Figure 9:
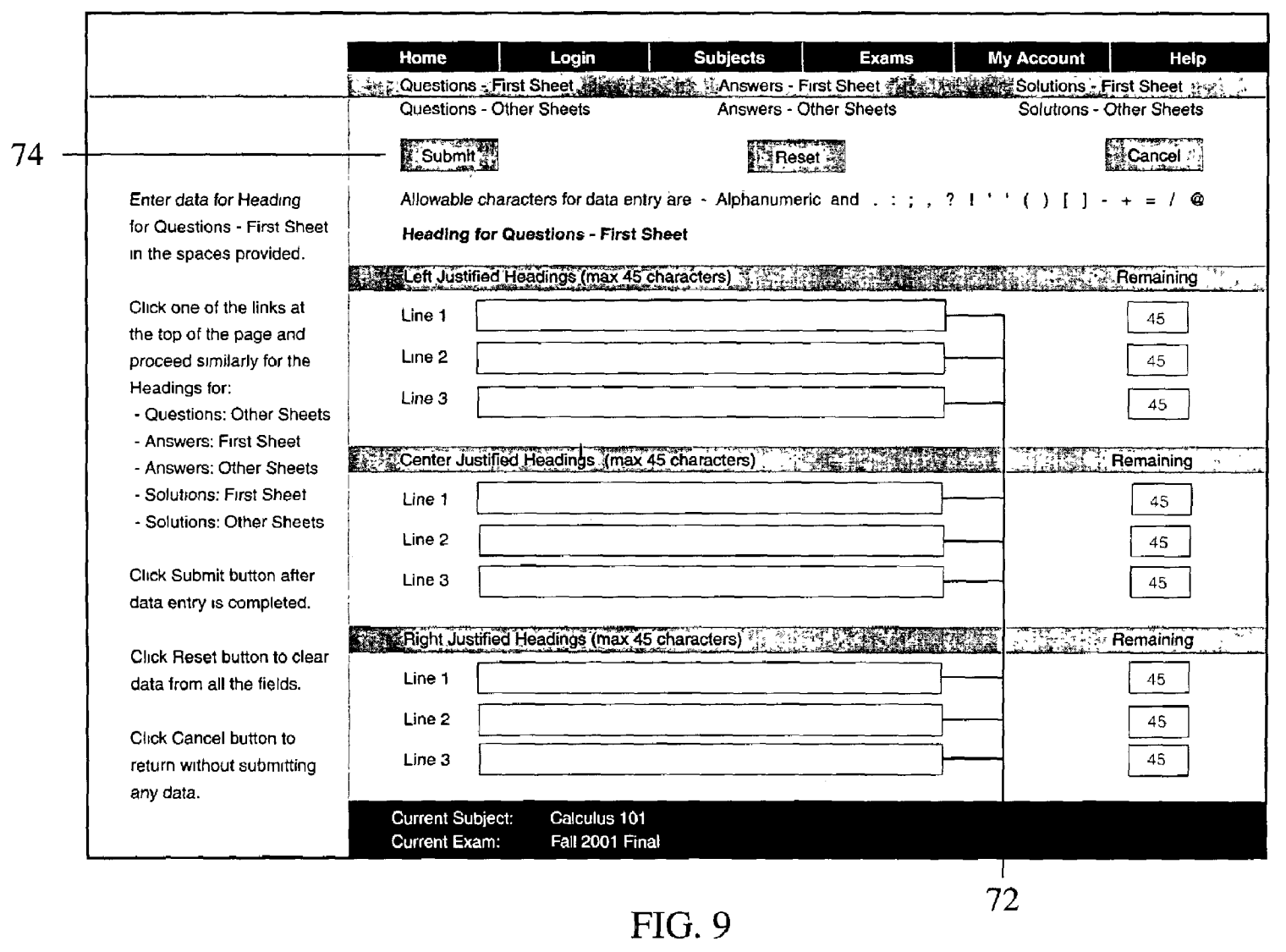

The user may next click the headings link (FIGS. 8A-8D) to display the Headings Page (FIG. 9). The user enters heading information in the text fields 72 and then clicks the submit button 74. The heading information is uploaded to the server for storage and the Questions Page is redisplayed.

Figure 10:
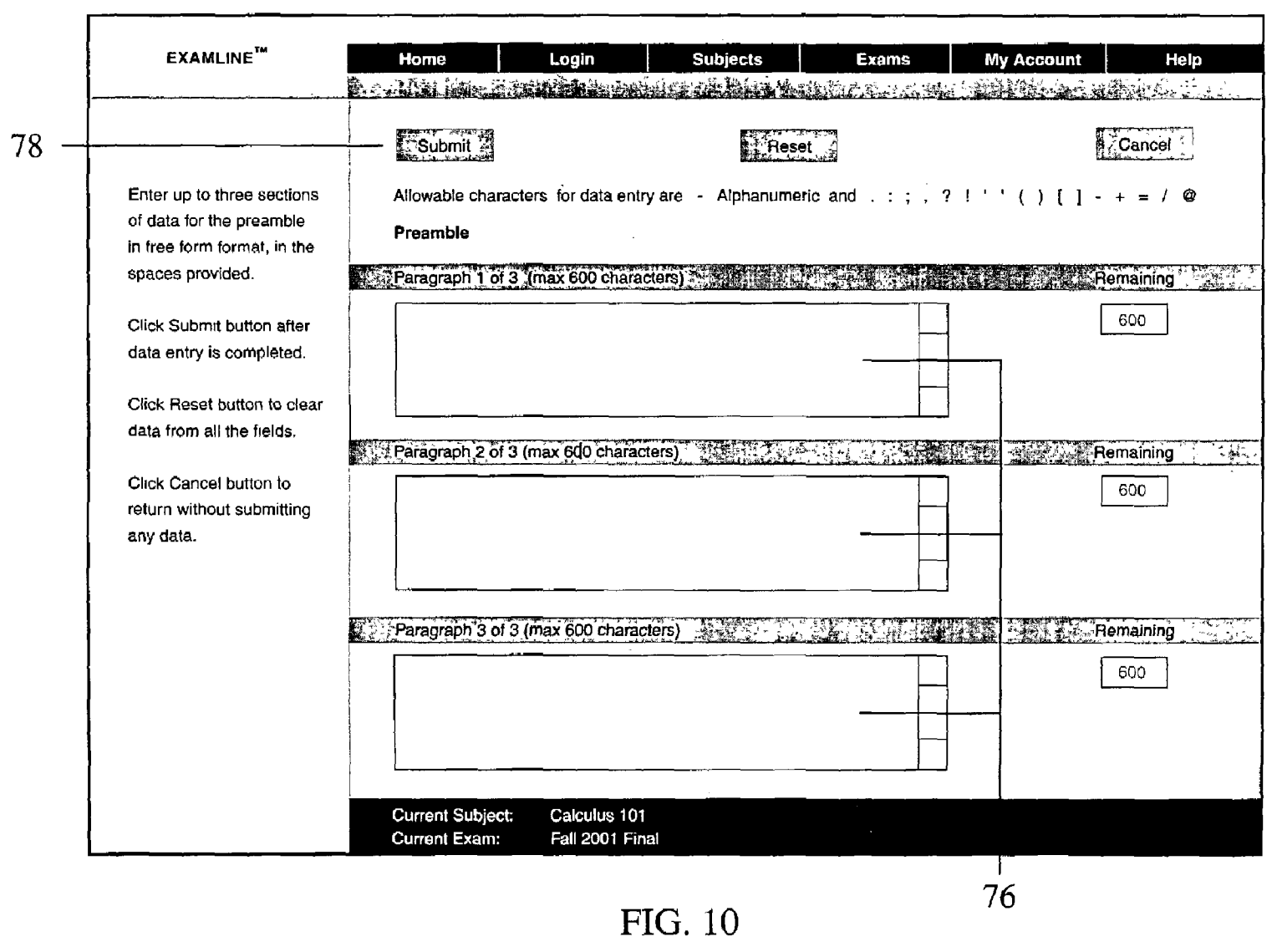

The user may next click the preamble link (FIGS. 8A-8D) to display Preamble Page (FIG. 10). The user enters preamble information in the text area fields 76 and then clicks the submit button 78. The preamble information is uploaded to the server for storage and the Questions Page is redisplayed.

Next, the user clicks the view draft of exam link and a typeset draft of the exam is generated by the middleware and back-end software. The Questions Page is redisplayed including the draft of the exam (FIG. 8D). If satisfied with the draft, the user clicks the typeset link (FIGS. 8A-8D) and the Confirm Typeset page is displayed (FIG. 12). The user clicks the confirm button 84 thereby generating the typeset question-based documents which may include typeset questions, answers and/or worked out solutions. If not satisfied with the draft, the user may further revise the document in accordance with the methods described above before proceeding to the final typesetting.

The Exams Page (FIG. 7) is redisplayed with the word "YES" in the typeset status column for the newly entered exam. The user may click the download button 56 to download the exam and the Download Page (FIG. 13A) is displayed. A user clicks the download questions link and the questions document appears within the portable document format file reader within the browser as shown in FIG. 13B. Next the user clicks the printer icon 86 within the portable document file reader and the Questions document is printed. Similarly, the user may click the download answers link to download the final typeset Answers document. The user clicks the printer icon within the portable document file reader and the Answers document is printed. Likewise, the user may click the download solutions link to download the final typeset worked out solutions document. The user clicks the printer icon within the portable document file reader and the worked out solutions document is printed.

To copy all or a portion of another exam to the current exam a user may click the "Copy From" link on the Questions Page (FIGS. 8A-8D). The Copy From Exam Page is displayed (FIG. 11) which includes a list 62 of others exams for the current subject which the user has previously entered into the system. This page also includes buttons 82 which the user can click to copy the headings, preamble, questions, or entire contents of one of these other exams to the current exam.

Accordingly, as should be understood, the system and method of the present invention generates customized publication quality typeset question-based documents in an expeditious and cost effective manner. The system and method of the present invention dynamically generates these question-based documents in accordance with User Specifications. Prefabricated static content would not satisfy an almost infinite number of combinations of individual user specifications for these question-based documents.

Another aspect of the present invention provides users of the system and system administrators with the ability to quickly and easily correct errors in questions, answers and/or worked out solutions that are stored on the server. In particular, when a user discovers an error, the user may simply communicate this error to the system administrator. This may be done as an e-mail, letter, phone call or any other means of communication. Once notified of these errors, the system administrator can simply load a corrected typeset version of the erroneous question, answer and/or worked out solution on the server. By correcting errors in this manner, it is no longer necessary to print errata sheets or to wait until the next version of the study guide is published to correct these errors. Thus, unlike the prior art, errors are quickly corrected with little effort and cost to the publisher. Additionally, a user a can submit by similar communication means new questions to be incorporated into the system. Thereafter, the publisher can simply load the questions onto the system in accordance with the methods described herein.

Now that the preferred embodiments of the present invention have been shown and described in detail, various modifications and improvements thereon will become readily apparent to those skilled in the art. For example, web pages may comprise an interface that is not specified herein, the server computer can comprise a distributed computing system or a cluster of networked computers, the relational database may comprise a distributed database or several databases, etc. Accordingly, the spirit and scope of the present invention is to be construed broadly and limited only by the appended claims and not by the foregoing specification.

What is claimed is:

1. A system for dynamically generating customized publication quality typeset question-based documents comprising:
    a server operating front end software, middleware software and back end software, wherein the front end software comprises:
    instructions for managing user specifications stored in a relational database; and
    the middleware software comprises:
    code for storing said user specifications; and
    code for copying said user specifications to a first text file, wherein said first text file is used as an input file for processing by the back end software, and the back end software comprises:
    directories for storing input files;
    instructions for scanning the directories for the first text file which comprises said user specifications;
    instructions for creating a second text file which is used as an input file for typesetting question-based documents in a publication quality; and
    said second text file which is used as an input file for typesetting question-based documents in a publication quality as customized to said user specifications by said front end, middleware and back end software, wherein said second text file comprises
    typesetting details for selected questions, associated answers and/or worked out solutions obtained from a flat file database and
    coded commands which define the formatting parameters for typesetting the question-based documents.

2. The system of claim 1, wherein said front end software further comprises instructions for processing requests from a client computer's web browser.

3. The system of claim 2, wherein said instructions for processing requests from a client computer's web browser include web server software and application server software.

4. The system of claim 1, wherein said instructions for managing user specifications include relational database management software.

5. The system of claim 1, wherein said middleware software further comprises code for generating a graphical user interface.

6. The system of claim 5, wherein said middleware software further comprises code for storing encrypted question-based documents.

7. The system of claim 6, wherein said question-based document includes questions, answers and/or worked out solutions.

8. The system of claim 1, wherein said first text file comprises user specifications obtained from the relational database.

9. The system of claim 1, wherein said second text file further comprises:
    page heading and preamble details for each question-based document obtained from the first text filet.

10. The system of claim 1, further comprising instructions for typesetting question-based documents in a page description language format.

11. The system of claim 10, further comprising instructions for processing said question-based documents in a page description language format to question-based documents in a portable document format.

12. The system of claim 11, further comprising instructions for encrypting said question-based documents.

13. A system for dynamically generating customized publication quality typeset question-based documents comprising:
- a server;
- a publication quality typeset catalog of questions stored on said server as sections of questions grouped by topic;
- a table of contents corresponding to said questions stored on said server;
- a first database stored on said server for storing user specifications created by a user for said question-based documents;
- a second database for storing typesetting details for all questions, associated answers and/or worked out solutions stored on said server;
- instructions for typesetting, in a publication quality, said question-based documents customized to said user specifications; and
- said typeset publication quality question-based documents customized to said user specifications generated by said instructions for typesetting.

14. The system of claim 13, wherein said typeset catalog of questions, is stored in an encrypted portable document format.

15. The system of claim 13, wherein said table of contents further comprises lists of questions by topic groups.

16. The system of claim 15, wherein said topic group lists of said table of contents comprises links to sections of questions stored on said server.

17. The system of claim 13, wherein said first database is a relational database.

18. The system of claim 13, wherein said second database is a flat file database.

19. The system of claim 13, further comprising the step of placing said question-based document in a portable document format.

20. The system of claim 19, further comprising the step of encrypting said question-based documents in portable document format.

* * * * *